No. 863,291. PATENTED AUG. 13, 1907.
W. LEECH.
DEVICE FOR THE PREVENTION OF THE PRACTICE OF ONANISM IN ANIMALS.
APPLICATION FILED FEB. 25, 1907.
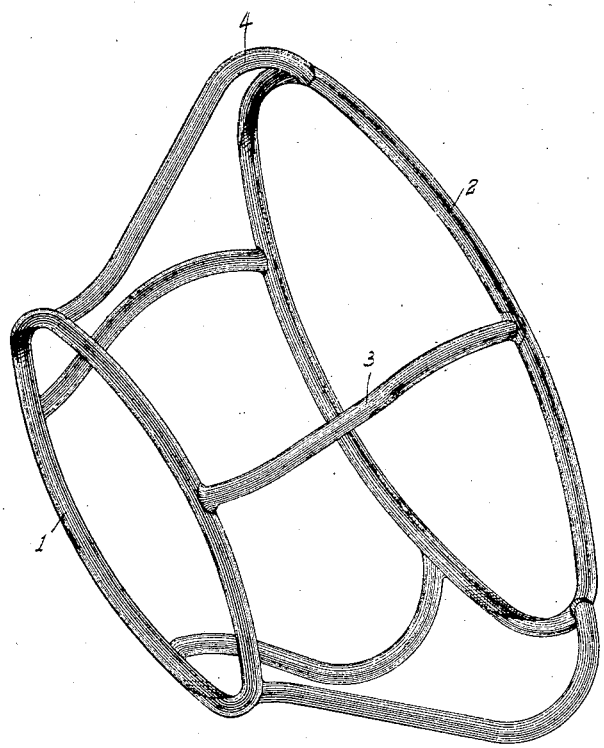
Witnesses
Inventor
William Leech,
By Percy S. Webster
Attorney

UNITED STATES PATENT OFFICE.

WILLIAM LEECH, OF MARYSVILLE, CALIFORNIA.

DEVICE FOR THE PREVENTION OF THE PRACTICE OF ONANISM IN ANIMALS.

No. 863,291.  Specification of Letters Patent.  Patented Aug. 13, 1907.

Application filed February 25, 1907. Serial No. 359,159.

To all whom it may concern:

Be it known that I, WILLIAM LEECH, a citizen of the United States, residing at Marysville, in the county of Yuba and State of California, have invented certain new and useful Improvements in Devices for the Prevention of the Practice of Onanism in Animals; and I do declare the following to be a full, clear, and exact description of the same, such as will enable others skilled in the art to which it appertains to make and use the same, reference being had to the accompanying drawings and the characters of reference marked thereon, which form a part of this specification.

This invention relates to improvements in certain devices used for the prevention of the abnormal practice of onanism in animals and particularly in horses, my object being to produce a simple and inexpensive device which will be easily handled and yet extremely effective for the purpose for which it is designed. This object I accomplish by means of a metal cage adapted to fit over the penis of the animal and prevent the enlargement thereof; this cage being constructed and handled substantially as will appear by a perusal of the following specification and claims.

The figure of the drawing shows a perspective view of the complete device much enlarged from its usual size.

1 designates a lower small ring and 2 is an upper larger ring, the said rings being joined together by means of connecting wires 3 said wires being formed with outward curves 4 at their connections with the ring 2 for the purpose as will appear.

In using the device the ring 2 is squeezed over the corona glandis or salient collar of the penis of the animal, the curved portions 4 rising over said salient collar thus preventing pressure and pain to the animal. The ring 1 fits over the glans penis, the whole device holding the entire head of the penis in its grip and thus preventing an erection of the penis when the animal has any abnormal desires, thus preventing that unnatural practice which is extremely injurious to the well being of the animal.

The device may be made preferably of aluminium but any other substance found desirable may be used. Also any desired size may be used as is found desirable. Thus it will be seen I have produced a device for the purpose which substantially fulfils all the objects of the invention as set forth herein.

While I have herein described a set detail of construction of the device still in practice many small deviations from such detail may be resorted to at will without departing from the spirit of the invention.

Having thus described the invention what I claim as new and useful and desire to secure by Letters Patent is:

1. A device of the character described comprising a pain-producing ring normally located in rear of the corona glandis, and means connected therewith and permanently located in front of said ring, for retaining said ring substantially in its normal position, said means being of a form to be substantially free from producing pressure on the penis of the animal.

2. A device of the character described comprising a pain-producing ring normally located in rear of the corona glandis, and means connected therewith and located in front of said ring, for retaining said ring substantially in its normal position, said means comprising a smaller ring located in front of and spaced from the pain-producing ring, said rings being connected together by a plurality of bars each of which is curved in a manner to prevent pressure on the penis of the animal.

3. A device of the character described comprising a pain-producing ring normally located in rear of the corona glandis, and means connected therewith and located in front of said ring, for retaining said ring substantially in its normal position, said means comprising a smaller ring located in front of and spaced from the pain-producing ring, said rings being connected together by a plurality of bars each of which is formed with an outwardly-extending bend or curved portion of sufficient size to prevent pressure on the penis of the animal.

In testimony whereof I affix my signature in presence of two witnesses.

WILLIAM LEECH.

Witnesses:
J. W. JAQUITH,
LEE L. BAILEY.